R. W. HOOVER.
FISHING TOOL FOR PUMPS.
APPLICATION FILED APR. 19, 1918.
1,347,041.
Patented July 20, 1920.
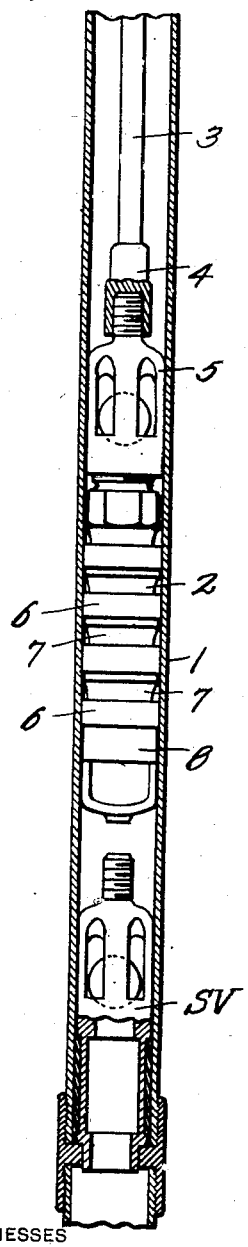
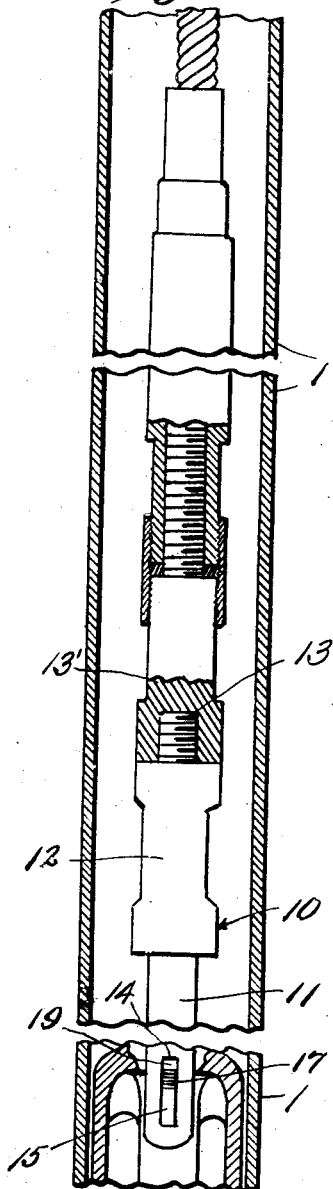
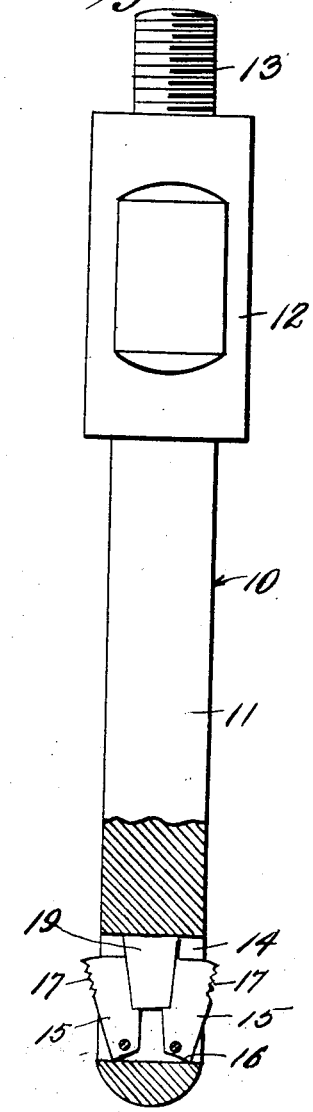
WITNESSES
James F. Crown,
S. M. McColl.
INVENTOR
Ralph W. Hoover,
BY Richard Bowen,
ATTORNEY

UNITED STATES PATENT OFFICE.

RALPH W. HOOVER, OF ARMSTRONGS MILLS, OHIO.

FISHING-TOOL FOR PUMPS.

1,347,041.  Specification of Letters Patent.  Patented July 20, 1920.

Application filed April 19, 1918. Serial No. 229,602.

*To all whom it may concern:*

Be it known that I, RALPH W. HOOVER, a citizen of the United States, residing at Armstrongs Mills, in the county of Belmont and State of Ohio, have invented certain new and useful Improvements in Fishing-Tools for Pumps, of which the following is a specification.

This invention relates to fishing tools for removing parts of a pump.

The object of the invention is to provide a simple and efficient tool of this character for removing parts of a working valve of a pump should they become disconnected, without necessitating the removal of the tubing from the well.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a longitudinal section of a portion of a pump showing the working valve in operative position therein, and adjacent parts, Fig. 2 shows a similar view with the valve disconnected and this improved tool in operative position ready for removing the disconnected parts, and Fig. 3 is a side elevation of the tool detached, parts being broken out.

In the accompanying drawings, a working barrel or tube 1 is shown of ordinary construction, having the usual working valve 2 therein carried by a valve rod 3, being detachably connected with said rod by means of a socket, a valve cage 5 being arranged between the socket and the rings and cups of the valve.

This working valve is composed as usual of a plurality of separable cups 6 and rings 7 mounted on a tube, not shown, the lower end of which has a cage-like bottom member 8 threaded on to the end of said tube. Frequently during the operation of the pump this member 8 becomes unscrewed thereby permitting the cups and rings to separate and become disconnected from the valve rod thus rendering the pump inoperative. It is to remove such disconnected parts that the tool 10 constituting this invention is designed.

The tool 10 which comprises this invention is composed of a solid metal rod 11 having a sinker 12 arranged intermediately thereof, preferably at its upper end, the end of the rod above the sinker being threaded and reduced as shown at 13 and adapted to be engaged with the socket member 13′ as is shown clearly in Fig. 2. The lower end of the rod 11 has an opening 14 extending transversely therethrough in which are mounted two dogs or triggers 15 which are pivotally mounted at their lower ends as shown at 16 and are shaped as shown at the lower end of Fig. 3 with their lower ends inclined outwardly from their rear to their front or outer edges and their outer edges at their upper ends threaded as shown at 17 to adapt them to be engaged with the bottom member 8 of the working valve when used for fishing out the parts of said valve. These dogs or gripping members 15 have shoulders 18 on their inner edges which are designed to engage the lower end of a rubber stop element 19 which is disposed between the dogs or gripping members 15 within the recess 14. This rubber stop member 19 tapers toward its lower end and is compressible to permit the dogs to be forced into the recess when it is desired to disconnect the parts therefrom which have been removed by the tool. The lower ends of these dogs are spaced from the bottom of the recess 14 a sufficient distance to permit the dogs to swing upwardly into the position shown in Fig. 3 and when they reach such position their lower outer corners will engage the bottom walls of the recess and limit their further outward movement. The tapered shape of the member 19 operates to hold the dogs 15 in the position shown in Fig. 3.

In the use of this tool, the valve 2 having been disconnected from the socket member 13′, the threaded end 13 of the tool is engaged with said socket and the device is lowered into the tube 1, the gripping members 15 passing through the cups and rings 6 and 7 and entering the lower member 8 of the working valve. When it reaches this valve, which is resting in disconnected position on the standing valve SV, the threaded faces of the dogs engage with the threads of the member 8, thereby stringing the cups and valves on the body portion 11 of the tool and holding them in this position by the engagement of the dogs with the member 8. The tool may then be withdrawn from the tube, carrying with it the disconnected cups and rings, and the bottom member 8 of the working valve and there is absolutely no danger of them being released accidentally during the withdrawing operation thereby saving much labor and time.

After the tool has been removed from the tube 1, the parts are disconnected by unscrewing the bottom member 8 from engagement with the dogs 15 and then these dogs are pressed inwardly into the recess 14 a sufficient distance to permit the rings and cups to be slipped off. They are then connected in the ordinary manner and the valve replaced in the tube 1.

From the above description it will be obvious that by the use of this tool the disconnected parts may be quickly and easily removed from the tube 1 and connected up and replaced without interfering with the position of the tube within the well.

The foregoing description and the drawings have reference to what may be considered the preferred or approved form of my invention. It is to be understood that I may make such changes in construction and arrangement and combination of parts, materials, dimensions, et al., as may prove expedient and fall within the scope of the claimed invention.

Having thus fully described my invention what I claim as new and desire to secure by Letters Patent, is:—

1. A tool of the class described comprising a rod having an opening extending transversely through its lower end, a pair of gripping elements pivotally mounted at their lower ends in the lower end of said opening with their outer edges at their upper ends threaded to interlockingly engage the threads of a valve, and a resilient element mounted between said elements.

2. A tool of the class described comprising a rod having an opening extending transversely through its lower end, a pair of substantially rectangular dogs pivotally mounted at the inner corners of their lower ends in the lower portion of said opening, the lower ends of said dogs being inclined upwardly and inwardly and spaced from the bottom wall of said opening a sufficient distance to permit the upper ends of the dogs to swing out of the opening, the outer lower corners of said dogs being adapted to engage the lower wall of said opening to limit the outward swinging of the dogs, the outer side edges of said dogs being threaded, and a resilient element positioned between said dogs and tapering toward its lower end.

In testimony whereof I affix my signature in presence of two witnesses.

RALPH W. HOOVER.

Witnesses:
WM. ATHEY,
JOHN S. RUSH.